United States Patent [19]
Gunther

[11] Patent Number: 4,981,608
[45] Date of Patent: Jan. 1, 1991

[54] INDUSTRIAL GELLING AGENT FOR HYDROPHOBIC ORGANIC LIQUIDS

[75] Inventor: John Gunther, St. Paul, Minn.

[73] Assignee: Minnesota Mining and Manufacturing Company, St. Paul, Minn.

[21] Appl. No.: 342,222

[22] Filed: Apr. 21, 1989

Related U.S. Application Data

[63] Continuation-in-part of Ser. No. 879,809, Jun. 27, 1986, abandoned.

[30] Foreign Application Priority Data

Apr. 22, 1988 [DE] Fed. Rep. of Germany ....... 3813597

[51] Int. Cl.[5] .................... B01J 13/00; C10M 117/02; C11C 1/00

[52] U.S. Cl. ............................ 252/315.2; 174/120 C; 260/414

[58] Field of Search .................. 44/7.3; 252/315.2, 35, 252/37; 71/64.09; 260/414; 514/944

[56] References Cited

U.S. PATENT DOCUMENTS

| | | | |
|---|---|---|---|
| 2,737,494 | 3/1956 | Frank | 252/35 X |
| 2,751,359 | 6/1956 | Hill et al. | 252/315.2 |
| 2,751,361 | 6/1956 | Van Strien et al. | 260/414 X |
| 2,802,850 | 8/1957 | Wetzel | 252/315.2 X |
| 2,952,695 | 9/1960 | Stedehouder et al. | 260/414 |
| 4,069,236 | 1/1978 | Hutchinson et al. | 260/414 |
| 4,664,822 | 5/1987 | Hunt et al. | 252/37 X |

FOREIGN PATENT DOCUMENTS

| | | |
|---|---|---|
| 0029589 | 6/1981 | European Pat. Off. . |
| 1535153 | 6/1968 | France . |
| 530374 | 12/1940 | United Kingdom . |
| 825878 | 12/1959 | United Kingdom . |

*Primary Examiner*—Richard D. Lovering
*Attorney, Agent, or Firm*—Donald M. Sell; Walter N. Kirn; Gerald F. Chernivec

[57] ABSTRACT

A gelling agent for hydrophobic organic liquids, such as mineral oil, comprising the reaction product of an organic poly-oxo-aluminum salt of a fatty acid and an organic reactant, particularly reactants having hydroxyl or carboxyl groups, in solid form. Preferably, the agent also contains an agent for reducing the settling or agglomeration of the gelling agent, such as particulate silicic acid or caoutchouc.

14 Claims, No Drawings

INDUSTRIAL GELLING AGENT FOR HYDROPHOBIC ORGANIC LIQUIDS

This application is a continuation-in-part of application Ser. No. 879,809, filed June 27, 1986, now abandoned.

TECHNICAL FIELD

The invention relates to industrial gelling agents, a method for the preparation thereof, and a method for impregnating electrical devices using same.

BACKGROUND ART

Hydrophobic organic liquids, such as mineral oil or the like, are frequently used as impregnating agents, because of their water-repellant and electrically insulating properties, for example for paper-insulated electrical cable, and/or as a filler material, for example in cable connections, electrical transformers and the like. In this connection, it is particularly advantageous that the liquid state of aggregation makes it possible to completely fill a given space without leaving cavities which can be deleterious, particularly in electrical installations. Furthermore, it is an advantage that many hydrophobic organic liquids have the property to creep even into smallest interstices. On the other hand, the use of a liquid as an impregnating or filling material requires a complete tightness of the enclosure into which the liquid is filled. This requirement often creates difficulties in practice. To circumvent these difficulties, it is known in the art to employ liquids which are solid at normal temperature and accordingly must be employed at elevated temperatures. In practical application, it is inconvenient to work at elevated temperatures and to provide therefore corresponding heating devices. Upon cooling-down, the liquid transforms into a solid mass which is no longer or still only slightly deformable; this is undesirable in several cases. Therefore, the use of industrial gelling agents has been reported which are added to the liquid and after a certain time form with the latter a gel which no longer can flow out through leaks and remains deformable. Known gelling agents of this kind contain organic aluminum compounds, particularly poly-oxo-aluminum compounds, which react with hydroxyl or carboxyl groups to form a thixotropic gel. In this manner, for instance, paints are provided with a, typically, desirable thixotropic property. Poly-oxo-aluminum compounds of the kind indicated are distributed, for instance, by the British company Manchem Ltd.

Frequently, hydrophobic organic liquids, particularly mineral oil or the like, do not comprise hydroxyl or carboxyl groups so that the gelling agents cannot react directly with these liquids. This is particularly true in electrical applications because impregnating and filling materials used therein do not contain, as a rule, hydroxyl or carboxyl groups. In such cases, therefore, a reactant, mostly in the form of a liquid, which contains the groups necessary for the gelling reaction were added upon the addition of the organic aluminum compound. For example, solvents which contain hydroxyl or carboxyl groups are suitable as a reactant. In a practical application, it is inconvenient to additionally add the reactant. Also, quantity errors may easily occur. Added thereto is the difficulty that the organic aluminum compounds react very strongly with moisture and thus must be stored and shipped under an air-tight seal and must be handled with great care.

In the course of the gelling reaction, the reactive groups of the reactant are converted into electrically unobjectionable compounds, whereby the insulating properites of the liquid improve gradually to an original value. This can be observed from the increase of the dielectric loss factor which can be easily measured. Normally, it will last several days until the electrical insulating properties of the gelled liquid have improved to the point where an operational electrical load is again possible. This long waiting time until the respective devices are put into operation is very inconvenient and causes considerable cost and time.

It is thus the object of the invention to provide an industrial gelling agent, particularly for electrical applications, which is more conveniently applicable and makes possible a reduction in the aforedescribed waiting times.

SUMMARY OF THE INVENTION

Briefly, the present invention provides an industrial gelling agent for hydrophobic organic liquids, such as mineral oil, based on organic poly-oxo-aluminum salts of fatty acids and reactants capable of reacting therewith, particularly reactants having hydroxyl or carboxyl groups, wherein the gelling agent is a solid obtained by reaction of selected poly-oxo-aluminum salts and corresponding reactants.

In another aspect, a method is provided for preparing an industrial gelling agent for organic liquids immiscible with water, such as mineral oil, based on organic poly-oxo-aluminum salts of fatty acids and organic reactants reacting therewith, particularly reactants having hydroxyl or carboxyl groups, by reacting a poly-oxo-aluminum salt of a fatty acid with a suitable reactant to a solid reaction product forming the gelling agent, and optionally comminuting the product.

In still another aspect, a method is provided for impregnating electrical devices, particularly cable connections, with an electrically non-conductive organic liquid, such as mineral oil, comprising adding to the liquid a gelling agent in a cavity provided in the device, the gelling agent being solid as described above.

DETAILED DESCRIPTION

The industrial gelling agent of the present invention is a solid material which is the result of a reaction of the poly-oxo-aluminum salts and a reactant. It has been found that the gelling agent is insensitive towards moisture and can be easily handled and stored, and will cause the desired gelling in a very short time after being added to the liquid to be thickened, which need not contain groups capable of reacting with poly-oxo-aluminum salt, the electrical insulating properties of the gel allowing an electrical load to be immediately applied to the gel, thus putting the respective electrical device into operation. The gelling agent is an almost inert solid material which can be stored and handled without particular precautions. Preferably, the gelling agent is pulverized. Then, it need only be sprayed or intermixed into the liquid to be gelled, whereupon gelling occurs within a comparably very short time, such as one hour. Through suitable selection of the poly-oxo-aluminum salt and the reactant, powder-like gelling agents can be obtained which are capable of effecting a gelling time in mineral oil of less than one hour.

With the inventive gelling agent, the reaction time needed for the reaction between the poly-oxo-aluminum salt and the reactant obviously is transferred into the preparation of the gelling agent because, normally, such reaction requires a reaction time of several hours at elevated temperatures of particularly 120° C. In the preparation of the gelling agent according to the invention, these reaction conditions are not disadvantageous. Decisive and surprising is the fact that in practical application, only a very short gelling time is necessary.

More particularly, it is possible to determine, by minor experimentation, pairs of poly-oxo-aluminum salts and reactants from which the gelling agent is capable of effecting a gelling time in mineral oil of below 10 minutes. In this connection, it is also of importance that in practical application, gelling time is dependent upon the particle size of the solid gelling agent. Therefore, a particle size corresponding to a desired gelling time can be selected, with smaller particle sizes corresponding to shorter gelling times.

In the application of the gelling agent of the invention, it is not necessary to elevate the temperature. It suffices to intermix the gelling agent with the liquid at room or ambient temperature. No further substances, like solvents and the like, need be added; accordingly, problems normally encountered with such additional materials, such as storage and environmental pollution are dispensed with. The gel obtained with insulating oils, such as hydrocarbon oils, like mineral oils, has good electrical insulating properties shortly after its preparation, such that device in which the gel is formed can be put into operation without delay. The gel has a very good temperature resistivity and can be maintained free of decomposition at temperatures of at least about 150° C.

Particularly advantageous properties are provided by a gelling agent, obtained by an essentially stoichiometric reaction of poly-oxo-aluminum stearate of the formula $$\left( O{=}Al{-}O{-}\underset{\underset{O}{\|}}{C}{-}C_{17}H_{35} \right)_n$$

wherein n is the number of recurring oxo-aluminum stearate units, with 2-ethyl hexanoic acid of the formula $$CH_3{-}(CH_2)_3{-}\overset{\overset{C_2H_5}{|}}{CH}{-}COOH.$$

This gelling agent has a density in the range of the density of organic liquids typically gelled, such as mineral oil. The density can be set within a certain range in accordance with the degree of polymerization of the organic aluminum salt. For example the density can be slightly greater than the density of the liquid to be gelled. This is advantageous, particularly upon intermixing. For example, the density can be about 0.97 $g/cm^3$.

Preparation of the industrial gelling agent of the invention can be carried out by reacting a correspondingly selected poly-oxo-aluminum salt of a fatty acid with the reactant to a solid reaction product forming the gelling agent, and possibly comminuting the product. Thus, only simple operational steps are necessary for the preparation.

In order that the gelling agent be obtained as a solid reaction product without undesired alien properties, it is appropriate to react the poly-oxo-aluminum salt essentially completely with a stoichometric amount of the reactant.

It has been found that the reaction proceeds particularly rapidly if a reactant is used which is substituted with low hydrocarbon radicals, preferably having five or less carbon atoms, particularly a liquid reactant in the form of an organic acid substituted with low hydrocarbon radicals. As the organic acid, appropriately a low alkanoic acid, having up to ten carbon atoms and preferably having five to ten carbons atoms, particularly ethyl or propyl hexanoic acid, can be used. The reactant 2-ethyl hexanoic acid has been found to be particularly useful in practice.

The reaction between the poly-oxo-aluminum salt and the reactant is performed appropriately at about 100 ° to 140° C., preferably at about 120° C. Then, a smooth reaction is obtained in a short reaction time with a minimum danger of decomposition.

The application of the gelling agent is very simple and offers particular advantages in the impregnation of electrical devices, particularly cable connections, with an electrically non-conductive organic liquid, such as mineral oil, wherein the liquid including the gelling agent is disposed in a cavity provided in the device. In accordance with the invention, a solid, powder-like gelling agent is used for this purpose. For example, the gelling agent can be sprayed or filled into the cavity which is already filled with the liquid. One method is particularly advantageous wherein the gelling agent is added to the liquid prior to the introduction thereof into the cavity; in accordance with the invention, the gelling agent is added to the liquid immediately prior to the introduction of the latter into the cavity. Then, the mixture remains of low viscosity sufficient to be able to creep, like the liquid, into all cavities and interstices.

It should be particularly noted that not any combination of an organic aluminum compound and a carboxylic acid will result in a gelling agent. If, for instance, instead of the above-described reaction between poly-oxo-aluminum stearate and the 2-ethyl hexanoic acid, a reaction is conducted between the same aluminum compound and stearic acid, a solid matter product will also be obtained. However, when that product is comminuted to form a powder, and the powder is intermixed at room temperature with mineral oil, a gel will not be formed. If, however, the aluminum salt and the stearic acid are intermixed prior to the reaction with the mineral oil, and the mixture is held for three to four minutes at 120° C., a gel will be formed. Thus, it is necessary, when deviating from the present examples, to determine suitable reactants for the employed organic aluminum salt by simple experimentation.

It has been found that the above gelling agents tend to change, e.g., after lengthy transportation; as a consequence, the gelling agent may partially settle during the gelling process and will not effect a uniform gelling. This is true particularly in connection with older gelling agents and typically not with a fresh one. It is assumed that external influences, for example shocks or the like, lead to an agglomeration of the small particles in the powderized gelling agent which then can affect properties.

This drawback can be eliminated by adding a particulated substance to the liquid to be gelled, the substance being capable of effecting an increase of the viscosity of the liquid The increased viscosity of the liquid has the result that the individual particles of the mixed-in gelling powder are stationarily located in the liquid to be gelled, i.e., the substantially uniform distribution of the particles in the liquid achieved by the mixing-in of the gelling agent is substantially maintained during the gelling process; a settling of the particles is thus prevented.

Various substances can be used to increase the viscosity. For example, particulated or powderized organic bentonite derivatives or powderized silicic acid can be used. Preferably, particulated or powderized caoutchouc is used, as caoutchouc effects a gradual increase in absorption, such as for example of mineral oil, which leaves sufficient time to the mineral oil to be distributed in a uniform manner and to fill out the smallest cavities after being filled into the enclosure.

Since it is not very convenient to separately provide particulated or powderized caoutchouc and to separately mix it into the liquid, the solid gelling agent can contain the particulated or powderized caoutchouc mixed therein.

Particularly suitable for this purpose is a synthetic caoutchouc which is polymerized from norbornene (bicyclo[2.2.1]-hept-2-en) monomers. The norbornene subunits are achieved through the Diels-Alder-reaction of cyclopentadiene with ethylene.

In an alternative embodiment, powderized hydrophobic silicic acid can be used.

Polynorbornene particles preferably can be used having a diameter equal to or less than about 0.8 mm or, more preferably, a diameter equal to or less than 0.5 mm. Such polynorbornene reactions are commercially available, such as under the trade name NORSOREX N or NORSOREX F, respectively. It has been found that the gelling agent can contain polynorbornene in a concentration of from about 15 to 25 weight percent, and preferably at a concentration of 19 weight percent.

If powderized silicic acid is used, a content of from about 5 to 15 weight percent, preferably 11 weight percent, can be used.

Suitable examples include the following:

EXAMPLE 1

| | |
|---|---|
| Polynorbornene (coarseness less than 0.8 mm or 0.5 mm) | 6% |
| Conventional gel powder, i.e., the reaction product of a stoichiometric amount of poly-oxo-aluminum stearate and 2-ethylehexanoic acid at 120° C. | 25% |
| Mineral oil | 69% |

EXAMPLE 2

| | |
|---|---|
| Powderized hydrophobic silicic acid (80 to 100 $m^2/g$) | 3% |
| Conventional gel powder | 25% |
| Mineral oil | 72% |

What is claimed is:

1. A gelling agent for a hydrophobic organic liquid comprising the solid reaction product of a poly-oxo-aluminum stearate of the formula $$\left( O{=}Al{-}O{-}\underset{\underset{O}{\|}}{C}{-}C_{17}H_{35} \right)_n$$

wherein n is the number of recurring oxo-aluminum stearate units, and 2-ethyl hexanoic acid of the formula $$CH_3{-}(CH_2)_3{-}\overset{\overset{C_2H_5}{|}}{CH}{-}COOH.$$

2. The agent of claim 1 having a density close to that of the density of the liquid to be gelled.
3. The agent of claim 2 wherein said density is slightly greater than the density of the liquid to be gelled.
4. The agent of claim 1 wherein said density is about 0.97 $g/cm^3$.
5. The agent of claim 1 in particulate form.
6. The agent of claim 5 wherein the particle size thereof is selected in correspondence with the desired gelling time.
7. The gelling agent of claim 1 further containing a solid material capable of increasing the viscosity of the liquid to be gelled.
8. The gelling agent of claim 7 wherein said solid material is hydrophobic silicic acid.
9. The gelling agent of claim 8 wherein said silicic acid is present at a concentration of from between about 5 and 15 weight percent.
10. The gelling agent of claim 7 wherein said material comprises particulate caoutchouc.
11. The gelling agent of claim 10 wherein said caoutchouc comprises an olefin polymer.
12. The gelling agent of claim 11 wherein said olefin polymer comprises norbornene (bicyclo[2.2.1]-hept-2-en) monomers.
13. The gelling agent of claim 12 wherein said olefin polymer is present in a concentration of from between about 15 and 25 weight percent.
14. The gelling agent of claim 10 wherein the coarseness of said caoutchouc is no greater than about 0.8 mm.

* * * * *

UNITED STATES PATENT AND TRADEMARK OFFICE
CERTIFICATE OF CORRECTION

PATENT NO. : 4,981,608

DATED : Jan. 1, 1991

INVENTOR(S) : Gunther John

It is certified that error appears in the above-identified patent and that said Letters Patent is hereby corrected as shown below:

Title page, Inventor: "John Gunther" correct name is -- Gunther John --;
and item [19] should read --John--.

Signed and Sealed this

Eleventh Day of August, 1992

*Attest:*

DOUGLAS B. COMER

*Attesting Officer* *Acting Commissioner of Patents and Trademarks*